(12) United States Patent
Lin

(10) Patent No.: US 11,849,436 B2
(45) Date of Patent: Dec. 19, 2023

(54) RADIO COMMUNICATION METHOD AND DEVICE

(71) Applicant: GUANGDONG OPPO MOBILE TELECOMMUNICATIONS CORP., LTD., Dongguan (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 148 days.

(21) Appl. No.: 17/351,041

(22) Filed: Jun. 17, 2021

(65) Prior Publication Data

US 2021/0314945 A1    Oct. 7, 2021

Related U.S. Application Data

(63) Continuation of application No. 16/872,232, filed on May 11, 2020, now Pat. No. 11,064,487, which is a
(Continued)

(51) Int. Cl.
*H04W 72/0446* (2023.01)
*H04L 5/00* (2006.01)

(52) U.S. Cl.
CPC ....... *H04W 72/0446* (2013.01); *H04L 5/0055* (2013.01)

(58) Field of Classification Search
CPC .. H04W 72/02; H04W 72/0446; H04L 5/0055
See application file for complete search history.

(56) References Cited

U.S. PATENT DOCUMENTS

2012/0134305 A1    5/2012    Damnjanovic et al.
2013/0215759 A1    8/2013    Wang et al.
(Continued)

FOREIGN PATENT DOCUMENTS

CN    101882981 A    11/2010
CN    102082647 A    1/2011
(Continued)

OTHER PUBLICATIONS

Guangdong OPPO Mobile Telecommunications Corp., Ltd., Communication Pursuant to Article 94(3) EP18906589.9, dated Oct. 8, 2021, 6 pgs.
(Continued)

*Primary Examiner* — Kevin C. Harper
(74) *Attorney, Agent, or Firm* — Morgan, Lewis & Bockius LLP

(57) ABSTRACT

Provided in an implementation of the present invention are a radio communication method and device capable of realizing feedback acknowledgement for a downlink channel repeatedly transmitted in a 5G system. The method comprises: a terminal transmitting feedback information at a first time unit, wherein the feedback information comprises feedback acknowledgement information corresponding to a first downlink channel transmitted by means of a target resource set, resource units in the target resource set belong to the same carrier, and repeated transmission of the first downlink channel occupies multiple resource units in the target resource set.

12 Claims, 4 Drawing Sheets

Related U.S. Application Data continuation of application No. PCT/CN2018/076854, filed on Feb. 14, 2018.

(56) References Cited

U.S. PATENT DOCUMENTS

| | | | |
|---|---|---|---|
| 2013/0258978 | A1 | 10/2013 | Aiba et al. |
| 2016/0192376 | A1 | 6/2016 | Lee et al. |
| 2016/0359663 | A1 | 12/2016 | Song et al. |
| 2017/0214495 | A1 | 7/2017 | Golitschek Edler Von Elbwart et al. |
| 2019/0082441 | A1* | 3/2019 | Liu .................. H04L 5/0044 |
| 2019/0181986 | A1 | 6/2019 | Kitamura et al. |
| 2019/0356430 | A1 | 11/2019 | Cheng et al. |
| 2019/0363840 | A1* | 11/2019 | Wang .................. H04L 1/1854 |
| 2020/0260447 | A1 | 8/2020 | Lin |
| 2021/0392630 | A1* | 12/2021 | Ying .................. H04W 72/0446 |

FOREIGN PATENT DOCUMENTS

| | | | |
|---|---|---|---|
| CN | 102082647 | A | 6/2011 |
| CN | 102148673 | | 8/2011 |
| CN | 102752088 | A | 10/2012 |
| CN | 105991243 | A | 5/2016 |
| CN | 105991243 | A | 10/2016 |
| CN | 106160983 | A | 11/2016 |
| CN | 106664167 | A | 5/2017 |
| CN | 109155696 | A | 1/2019 |
| CN | 109155696 | A | 4/2019 |
| EP | 3062457 | A1 | 8/2016 |
| JP | 2012-109955 | A | 6/2012 |
| JP | WO2017221871 | A1 | 5/2019 |
| JP | 2021-511744 | A | 5/2021 |
| WO | WO2015/021318 | A2 | 2/2015 |
| WO | WO2017015836 | A1 | 2/2017 |
| WO | WO2017221871 | A1 | 12/2017 |

OTHER PUBLICATIONS

Guangdong OPPO Mobile Telecommunications Corp., Ltd., Examination Report, IN202027035473, dated Dec. 15, 2021, 5 pgs.
Guangdong OPPO Mobile Telecommunications Corp., Ltd., CN202010259693.1, First Office Action, dated Sep. 7, 2022, 20 pgs.
Liu Gao-hua et al., "Transmission Technique of Hybrid Automatic Repeat Request Based on Frequency Resources Re-Election in Long Term Evolution", Journal of Computer Applications, Jul. 1, 2012, 14 pgs.
Guangdong OPPO Mobile Telecommunications Corp., Ltd., KR10-2020-7022794, First Office Action, dated Oct. 19, 2022, 10 pgs.
Yanan Lin, U.S. Appl. No. 16/864,730, Non-Final Office Action, dated Sep. 9, 2022, 11 pgs.
Nokia, Alcatel-Lucent shanghai Bell, "On cross-carrier scheduling and joint UCI design," 3GPP TSG RAN WG1 NR#2, R1-1710885, Qingdao, China, Jun. 27-30, 2017, 6 pgs.
Notice of Reasons for Refusal, JP2020-542616, dated Feb. 22, 2022, 12 pgs.
Guangdong OPPO Mobile Telecommunications Corp., Ltd., CN202010259693.1, Second Office Action, dated Mar. 2, 2023, 6 pgs.
Guangdong OPPO Mobile Telecommunications Corp., Ltd., CN202010259693.1, Notice of Allowance, dated Apr. 26, 2023, 6 pgs.
InterDigital Communications, "MAC Layer Impact of Supporting Different Services", R2-168468, 3GPP TSG-RAN WG2 #96, Reno, Nevada Nov. 14-18, 2016, 4 pgs.
Nortel Networks, "NBAP Review", R3-031876, 3GPP TSG-RAN3 Meeting #39, San Diego, California, USA, Nov. 17-21, 2003, 664 pgs.
Guangdong OPPO Mobile Telecommunications Corp., Ltd., KR10-2020-7022794, Decision of Rejection, dated Apr. 23, 2023, 10 pgs.
Guangdong OPPO Mobile Telecommunications Corp., Ltd., PCT/CN2018/076854, International Search Report and Written Opinion, dated Sep. 4, 2018, 9 pgs.
3GPP TS 38.213, V15.0.0, 3rd Generation Partnership Project, Technical Specification Group Radio Access Network, NR, Physical layer procedures for control, Release 15, (Dec. 2017), 56 pgs.
Ericsson, Summary of 7.3.3.1 (resource allocation), TSG-RAN WG1 AdHoc 1801, R1-1801011, Vancouver, Canada, Jan. 22-26, 2018, 14 pgs.
Guangdong OPPO Mobile Telecommunications Corp. Ltd., EP18906589.9, Extended European Search Report, dated Dec. 15, 2020, 8 pgs.
Guangdong OPPO Mobile Telecommunications Corp. Ltd., AU2018408725, First Office Action, dated Aug. 10, 2023, 3 pgs.
Guangdong OPPO Mobile Telecommunications Corp. Ltd., EP18906589.9, Fourth Office Action, dated Aug. 11, 2023, 4 pgs.
Guangdong OPPO Mobile Telecommunications Corp. Ltd., KR10-2020-7022794, Notice of Allowance, dated Aug. 28, 2023, 3 pgs.

* cited by examiner

RADIO COMMUNICATION METHOD AND DEVICE

CROSS-REFERENCE TO RELATED APPLICATIONS

This application is a continuation application of U.S. patent application Ser. No. 16/872,232, filed May 11, 2020 and entitled "RADIO COMMUNICATION METHOD AND DEVICE", which is a continuation of PCT Patent Application No. PCT/CN2018/076854, entitled "RADIO COMMUNICATION METHOD AND DEVICE" filed on Feb. 14, 2018, both of which are incorporated by reference in their entirety.

TECHNICAL FIELD

Implementations of the present disclosure generally relate to communication technologies, and more particularly, to wireless communication methods and devices.

BACKGROUND

In a Long Term Evolution (LTE) system, after receiving a downlink channel, for example, a Physical Downlink Shared Channel (PDSCH), a terminal may send feedback response information for the downlink channel.

In the New Radio (NR) system, how to transmit the feedback information for the downlink channel is an urgent problem.

SUMMARY

Implementations of the present disclosure provide a wireless communication method and device.

According to a first aspect, there is provided a wireless communication method, including:
  determining, by a terminal, feedback information, wherein the feedback information comprises feedback response information corresponding to a first downlink channel transmitted in a target resource set, and the first downlink channel is repeatedly transmitted within L resource units in the target resource set, the feedback response information corresponding to the first downlink channel occupies one bit group of the feedback information, the number of bits comprised in the bit group is equal to a value of a first parameter or 1;
  sending, by the terminal, the feedback information in a first time unit.

According to a second aspect, there is provided a wireless communication method, including:
  receiving, by a network device, feedback information on a first time unit;
  wherein the feedback information includes feedback response information corresponding to a first downlink channel transmitted in a target resource set, resource units belong to a same carrier, and the first downlink channel is repeatedly transmitted within a plurality of resource units in the target resource set.

According to a third aspect, there is provided a terminal. The terminal is configured to perform the methods of the first aspect or any possible implementation of the first aspect described above. In particular, the terminal includes functional modules for performing the methods of the first aspect or any possible implementation of the first aspect described above.

According to a fourth aspect, there is provided a network device. The network device is configured to perform the methods of the second aspect or any possible implementation of the second aspect described above. In particular, the network device includes functional modules for performing the methods of the second aspect or any possible implementation of the second aspect described above.

According to a fifth aspect, there is provided a terminal, including: a processor, a memory and a transceiver. The processor, the memory, and the transceiver communicate with each other through an internal connection path to transfer control and/or data signals, so that the terminal executes the methods of the first aspect or any possible implementation of the first aspect described above.

According to a sixth aspect, there is provided a network device, including: a processor, a memory and a transceiver. The processor, the memory, and the transceiver communicate with each other through an internal connection path to transfer control and/or data signals, so that the network device executes the methods of the second aspect or any possible implementation of the second aspect described above.

According to a seventh aspect, there is provided a computer-readable medium for storing computer programs including instructions configured to perform the methods of the above aspects or any possible implementation of the above aspects.

According to an eighth aspect, a computer program product including instructions is provided. When executed on a computer, the computer program product causes the computer to perform the methods of the above aspects or any possible implementation of the above aspects.

BRIEF DESCRIPTION OF THE DRAWINGS

In order to more clearly describe the technical solutions of the implementations of the present disclosure, the drawings used in the implementations or the description of the prior art will be briefly introduced below. It should be appreciated that the drawings in the following description only show some exemplary implementations of the present disclosure. For those of ordinary skill in the art, other implementations may be obtained based on these drawings.

DETAILED DESCRIPTION

The technical solutions in the implementations of the present disclosure will be described below with reference to the drawings. It should be appreciated that the described implementations are a part of the implementations of the present disclosure, but not all of the implementations. Based on the implementations in the present disclosure, all other implementations obtained by a person of ordinary skill in the art without creative efforts shall fall within the protection scope of the present disclosure.

Technical solutions of implementations of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a LTE system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a future 5G system (also called as a New Radio (NR) system), and so on.

Figure 1:
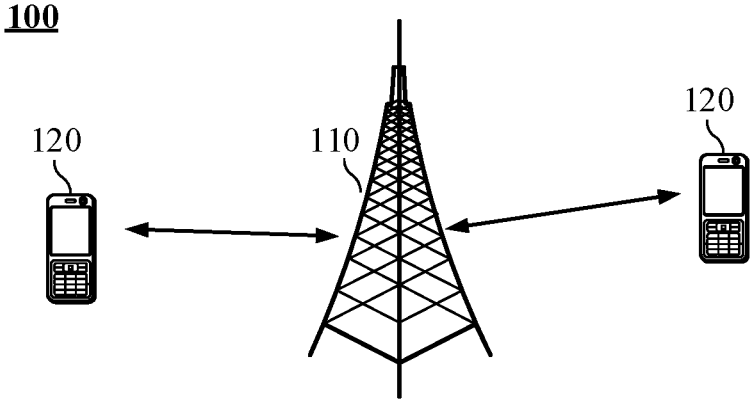
FIG. 1 is a schematic diagram of a wireless communication system according to an implementation of the present disclosure.

FIG. 1 shows a wireless communication system 100 applied in implementations of the present disclosure. The wireless communication system 100 may include a network device 110. The network device 100 may be a device that communicates with a terminal device. The network device 100 may provide communication coverage for a specific geographic area, and may communicate with a terminal device (such as a UE) within the coverage area. According to exemplary implementations, the network device 100 may be a Base Transceiver Station (BTS) in a GSM system or a CDMA system, a base station (NodeB, NB) in a WCDMA system, or an evolved base station (Evolutional Node B, eNB or eNodeB) in an LTE system, or a wireless controller in a Cloud Radio Access Network (CRAN), or the network device may be a relay station, an access point, an in-vehicle device, a wearable device, a network-side device in the future 5G network or a network device in a future evolved Public Land Mobile Network (PLMN).

The wireless communication system 100 further includes at least one terminal device 120 within the coverage area of the network device 110. The terminal device 120 may be mobile or fixed. According to exemplary implementations, the terminal device 120 may refer to an access terminal, user equipment (UE), a subscriber unit, a subscriber station, a mobile station, a mobile terminal, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handled device with wireless communication functions, computing devices or other processing devices connected to wireless modems, in-vehicle devices, wearable devices, terminal devices in future 5G networks, or terminal devices in the future evolutional PLMN, and so on.

According to exemplary implementations, the terminal devices 120 may perform Device to Device (D2D) communication.

According to exemplary implementations, the 5G system or network may also be referred to as a New Radio (NR) system or network.

FIG. 1 exemplarily shows one network device and two terminal devices. According to other implementations, the wireless communication system 100 may include multiple network devices and the coverage of each network device may include other numbers of terminal devices. Implementations of the present disclosure do not impose specific limitations on this.

According to exemplary implementations, the wireless communication system 100 may further include other network entities such as a network controller, a mobility management entity, and the like, and implementations of the present disclosure do not impose specific limitations on this.

It should be understood that the terms "system" and "network" are often used interchangeably herein. The term "and/or" describes a kind of association relationship between related objects, which means that there can be three kinds of relationships, for example, A and/or B can mean: A exists alone, both A and B exist, and B exists alone. In addition, the character "/" generally indicates that the related objects are an "or" relationship.

Figure 2:
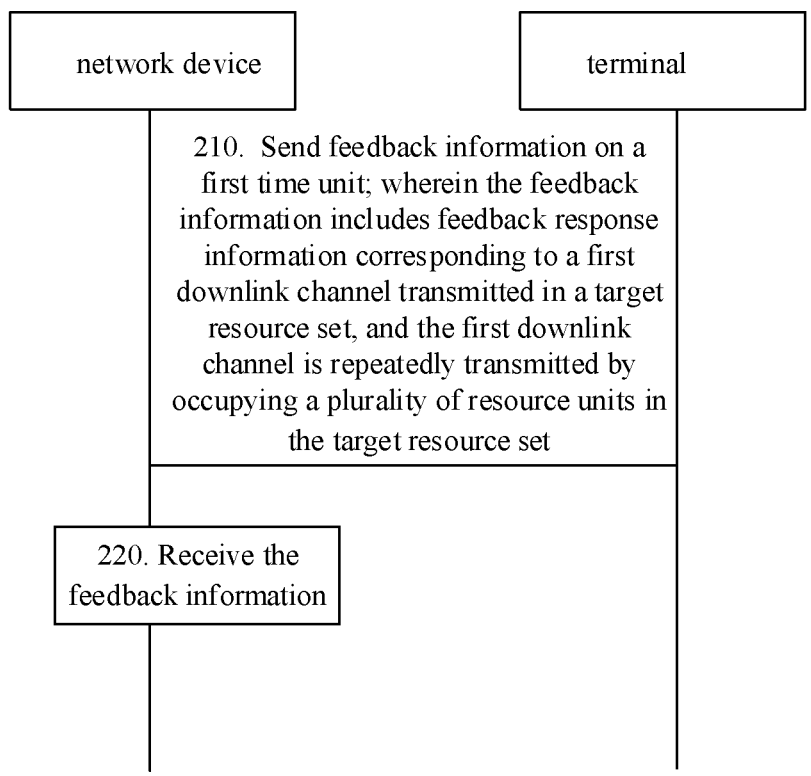
FIG. 2 is a schematic flowchart of a wireless communication method according to an implementation of the present disclosure.

FIG. 2 is a schematic flowchart of a wireless communication method 200 according to an implementation of the present disclosure. The method 200 may be applied to the system shown in FIG. 1, but is not limited thereto. As shown in FIG. 2, the method 200 includes at least part of the following.

In 210, a terminal device sends feedback information on a first time unit.

The feedback information includes feedback response information corresponding to a first downlink channel transmitted in a target resource set, resource units included in the target resource set belong to a same carrier, and the first downlink channel is repeatedly transmitted within a plurality of resource units in the target resource set.

According to exemplary implementations, the first time unit may be a time slot, a mini time slot, a symbol, or the like.

According to exemplary implementations, the size of the resources occupied by the resource units in the target resource set in the time domain may be the same.

According to exemplary implementations, each resource unit in the target resource set may occupy one or more time slots or one or more symbols in a time slot in the time domain.

According to exemplary implementations, the target resource set may be used to transmit multiple downlink channels, and each downlink channel may occupy at least one resource unit. The number of resource units occupied by the multiple downlink channels may be different.

If the target resource set is used to transmit multiple downlink channels, the feedback information may carry feedback information for multiple downlink channels.

According to exemplary implementations, the NR system supports ACK/NACK multiplexed transmission, that is, ACK/NACK information corresponding to multiple PDSCHs is transmitted through one PUCCH. For ACK/NACK multiplexed transmission, two ACK/NACK information generation methods are supported: semi-static determination of the number of ACK/NACK bits (semi-static HARQ-ACK codebook) and dynamic determination of the number of ACK/NACK bits (dynamic HARQ-ACK codebook). When the semi-static determination of the number of ACK/NACK bits is configured, the terminal determines the number of ACK/NACK bits according to the maximum and minimum values in the supported pre-configured set. For example, in the case of single carrier and single codeword transmission, the pre-configured set is {1,2,3,4,5,6,7,8}, the number of ACK/NACK bits is 8−1=8 bits.

According to exemplary implementations, the network device may cascade the feedback response information corresponding to multiple resource sets on multiple carriers, and send the cascaded feedback response information to the network device.

In 220, the network device receives feedback information on the first time unit.

Therefore, in the implementations of the present disclosure, the feedback information sent by the terminal device may include feedback response information for a downlink channel repeatedly transmitted in multiple resource units, and thus the implementations of the present disclosure may realize providing of feedback response for the downlink channel which is repeatedly transmitted in a 5G system.

According to exemplary implementations, the target resource set is determined according to a higher layer parameter.

Specifically, the network device may configure the target resource set for the terminal through a higher layer parameter. In this way, the terminal can determine the target resource set according to the higher layer parameter.

According to exemplary implementations, each resource unit in the target resource set is an occasion for candidate transmission of a downlink channel.

It should be understood that the fact that each resource unit can be configured to transmit a downlink channel does not mean that the resource set is necessarily used to transmit a downlink channel, this just means that the resource units supports transmission of the downlink channel.

According to exemplary implementations, when a resource unit transmits a downlink channel, one or more code blocks may be transmitted in one resource unit, or one or more transmission blocks may be transmitted in one resource unit.

According to exemplary implementations, the repeated transmission of the first downlink channel in multiple resource units means that the information transmitted by the multiple resource units is the same.

According to exemplary implementations, before sending the feedback information on the first time unit, the terminal device determines the number of bits of the feedback information.

According to exemplary implementations, before receiving the feedback information on the first time unit, the network device determines the number of bits of the feedback information.

According to exemplary implementations, the number of bits of the feedback information is related to the number of resource units in the target resource set, that is, the number of bits of the feedback information is determined based on the number of resource units in the target resource set.

According to exemplary implementations, each resource unit in the target resource set corresponds to a bit group in the feedback information.

According to exemplary implementations, the bit group corresponding to the resource unit may carry placeholder information.

For example, when there is no downlink channel transmission on a resource unit, or the feedback response information corresponding to the downlink channel sent by the resource unit is already carried on the bit group corresponding to other resource units (the downlink channel is repeatedly transmitted), the bit group corresponding to the resource unit can carry the placeholder information.

In order to provide a clearer understanding of the present disclosure, several methods for determining the number of bits of feedback information and corresponding methods for carrying the feedback response information will be described below Implementation A The number of bits of the feedback information is equal to the number of resource units in the target resource set.

According to exemplary implementations, the feedback response information corresponding to the first downlink channel occupies L bit groups in the feedback information, wherein the first downlink channel may be repeatedly transmitted within L resource units. The number of bits in the bit group is equal to 1.

In other words, feedback response information is sent for the downlink channel transmitted by each resource unit of the L resource unit.

According to exemplary implementations, the number of bits included in the bit group is equal to 1, and this means that a PDSCH with one code block group or transmission block is transmitted in one resource unit.

The order of the L bit groups in the bit groups included in the feedback information is equal to the order of the L resource units in the target resource set.

According to exemplary implementations, the L resource units may be L consecutive resource units, and under such condition, the feedback response information having L bits may also occupy L consecutive bits.

According to exemplary implementations, the information included in the L bit groups is the same.

According to exemplary implementations, the feedback information corresponding to the resource unit that has not sent the downlink channel in the target resource set may be placeholder information, for example, may be 0.

Figure 3:
FIG. 3 is a schematic diagram of a PDSCH carried by a target resource set according to an implementation of the present disclosure.

For example, as shown in FIG. 3, the resource set corresponding to slot n+8 is slot n~n+7 in the time domain, PDSCH1 is repeatedly transmitted in slot n+1, slot n+2, and slot n+3, PDSCH2 is repeatedly transmitted in slot n+4, slot n+5 and slot n+6. The terminal determines that the sequence length of the feedback information transmitted in slot n+8 is 8. The terminal generates the following feedback information: {0, b1, b1, b1, b2, b2, b2, 0}, where bi is the ACK/NACK information corresponding to the PDSCHi, and "0" is placeholder information.

According to exemplary implementations, the first downlink channel is repeatedly transmitted within L resource unit, and the feedback response information corresponding to the first downlink channel occupies 1 bit group in the feedback information, where the number of bits included in the bit group is equal to 1.

Specifically, since the L resource units repeatedly transmit the first downlink channel, the feedback response information may be transmitted once.

According to exemplary implementations, the order of the 1 bit group in the bit groups included in the feedback information is equal to the order of one of the L resource units in the target resource set. The one resource unit may be any one of the L resource units, or may be the first resource unit, or may be the last resource unit.

For example, as shown in FIG. 3, the resource set corresponding to slot n+8 is slot n~n+7 in the time domain, PDSCH1 is repeatedly transmitted in slots n+1, n+2, and n+3, and PDSCH2 is repeatedly transmitted in slots n+4, n+5 and n+6. The terminal determines that the sequence length of the feedback information transmitted in slot n+8 is 8. The terminal generates the following feedback information: {0, 0, 0, b1, 0, 0, b2, 0}, where bi is the ACK/NACK information corresponding to the PDSCHi, and "0" is placeholder information.

Implementation B

The terminal determines that the number of bits of the feedback information is equal to a product of the number of resource units in the target resource set and a first parameter.

According to exemplary implementations, the feedback response information corresponding to the first downlink channel occupies L bit groups in the feedback information, and the first downlink channel is repeatedly transmitted within L resource units. The number of bits included in the bit group is equal to the value of the first parameter.

For example, each resource unit can transmit multiple code block groups or multiple transmission blocks, and feedback response information for the multiple code block groups or multiple transmission blocks need to be sent. Each bit group can carry bits the number of which is the same as the number of the code block groups or the transmission blocks.

According to exemplary implementations, the information included in the L bit groups is the same. For example, each bit group includes feedback response information for the multiple code block groups or multiple transmission blocks.

The order of the L bit groups in the bit groups included in the feedback information is equal to the order of the L resource units in the target resource set.

According to exemplary implementations, the first downlink channel is repeatedly transmitted within L resource units, and the feedback response information corresponding to the first downlink channel occupies one bit group in the feedback information. The number of bits included in the bit group is equal to the value of the first parameter.

Specifically, since the L resource units repeatedly transmit the first downlink channel, the feedback response information may be transmitted once.

The order of the one bit group in the bit groups included in the feedback information is equal to the order of one of the L resource units in the target resource set. The one resource unit may be any one of the L resource units, or may be the first resource unit, or may be the last resource unit.

Implementation C

The terminal determines that the number of bits of the feedback information is equal to a value obtained by rounding up or rounding down the number of resource units in the target resource set divided by L, wherein each downlink channel received by the terminal is repeatedly transmitted within L resource units.

According to exemplary implementations, the feedback response information corresponding to the first downlink channel occupies one bit group in the feedback information; there is one bit included in the bit group.

According to exemplary implementations, that the number of bit included in the bit group is equal to one may mean that a PDSCH with one code block group or transmission block is transmitted in one resource unit.

According to exemplary implementations, the order of the one bit group in the bit groups included in the feedback information is equal to:

a value obtained by rounding up P divided by L, where P is equal to the number of the last resource unit occupied by the first lower channel in the target resource set, and P is a positive integer.

According to exemplary implementations, the order of the one bit group in the bit groups included in the feedback information is equal to:

a value obtained by rounding down K divided by L, where K is equal to the number of the first resource unit occupied by the first downlink channel in the target resource set, and K is a positive integer.

Figure 4:
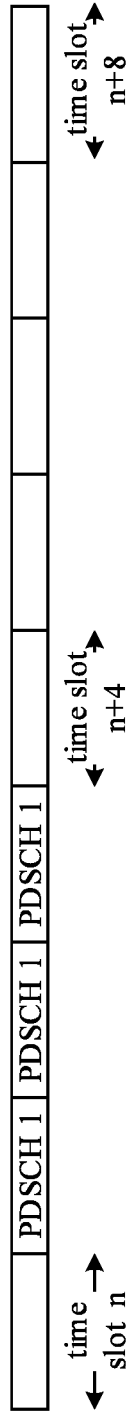
FIG. 4 is a schematic diagram of a PDSCH carried by a target resource set according to an implementation of the present disclosure.
Figure 5:
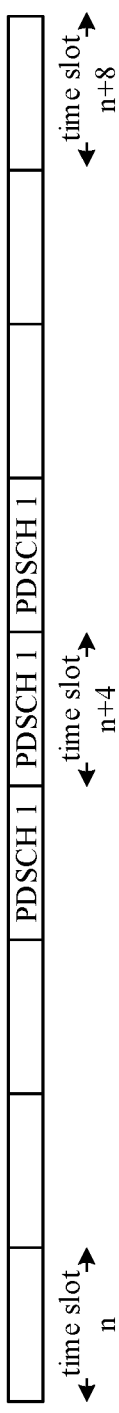
FIG. 5 is a schematic diagram of a PDSCH carried by a target resource set according to an implementation of the present disclosure.

According to exemplary implementations, the terminal determines the length of the feedback information bit sequence according to the feedback time slot and the time slot aggregation length (the number of time slots for repeatedly transmitting the PDSCH). As shown in FIGS. 4 and 5, the set of time units corresponding to slot n+8 is slots n~n+7, and the slot aggregation length is 3, which is configured by higher layer signaling. The terminal determines that the length of the feedback information sequence transmitted in slot n+8 is ⌊8/3⌋=2. The number of the starting slot for the target PDSCH number is $n_i$, then the index of the feedback response information for the target PDSCH in the feedback information sequence is equal to a value obtained by rounding down the number of available slots between slot $n_i$ and slot $n_0$ (the first slot in the resource set) divided by the slot aggregation length. For the case shown in FIG. 4, the generated feedback information sequence is {b1,0}, and for the case shown in FIG. 5, the generated feedback information sequence is {0, b1}.

Implementation D

The terminal determines that the number of bits of the feedback information is equal to a value obtained by rounding up or rounding down a product of the number of resource units in the target resource set and the first parameter, the product being divided by L. Each downlink channel received by the terminal is repeatedly transmitted within L resource units.

According to exemplary implementations, the feedback response information corresponding to the first downlink channel occupies one bit group in the feedback information; the number of bits included in the bit group is the value of the first parameter.

For example, each resource unit can transmit multiple code block groups or multiple transmission blocks, and feedback response information for the multiple code block groups or multiple transmission blocks need to be sent. Each bit group can carry bits, the number of which is the same as the number of code block groups or transmission blocks.

According to exemplary implementations, the order of the one bit group in the bit groups included in the feedback information is equal to:

a value obtained by rounding down K divided by L, where
K is equal to the number of the first resource unit occupied by the first downlink channel in the target resource set, and K is a positive integer; or,
a value obtained by rounding up P divided by L, where P is equal to the number of the last resource unit occupied by the first downlink channel in the target resource set, and P is a positive integer.

According to exemplary implementations of the present disclosure, the first parameter mentioned above may be configured by a network; or, the first parameter is the maximum number of transmission blocks; or, the first parameter is the maximum number of code block groups.

According to exemplary implementations, in a 5G (NR, new radio) system, for the PDSCH, dynamic indication of feedback timing of the feedback response information (Hybrid Automatic Repeat reQuest (HARQ) timing) is supported. That is, the terminal determines a pre-configured timing set, which may include 8 values, for example, {K10, K11, K12, K13, K14, K15, K16, K17}. Downlink Control Information (DCI) indicates that the PDSCH is transmitted in slot n, and the DCI contains a 3-bit target information field for indicating a value K1i in the timing set. The terminal sends the positive acknowledgement (Acknowledge, ACK)/negative acknowledgement (Non-Acknowledge, NACK) information corresponding to the PDSCH in slot n+K1i.

Figure 6:
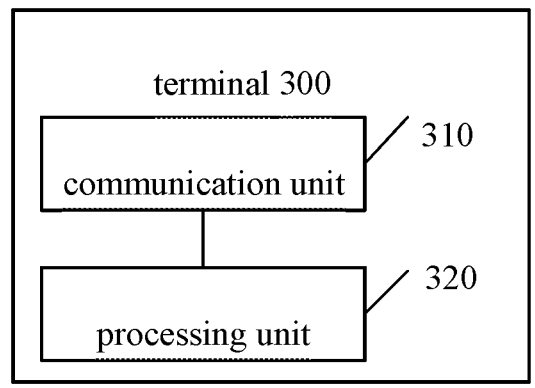
FIG. 6 is a schematic block diagram of a terminal according to an implementation of the present disclosure.

FIG. 6 is a schematic block diagram of a terminal 300 according to an implementation of the present disclosure. As shown in FIG. 6, the terminal 300 includes a sending unit 310.

The sending unit 300 is configured to send feedback information on a first time unit.

The feedback information includes feedback response information corresponding to a first downlink channel transmitted in a target resource set, resource units included in the target resource set belong to a same carrier, and the first downlink channel is repeatedly transmitted within a plurality of resource units in the target resource set.

According to an exemplary implementation, the target resource set is determined according to a higher layer parameter.

According to an exemplary implementation, each resource unit in the target resource set is an occasion for candidate transmission of a downlink channel.

As shown in FIG. 6, the terminal 300 further includes a processing unit 320 configured to determine the number of bits of the feedback information.

According to an exemplary implementation, the number of bits of the feedback information is determined based on the number of resource units in the target resource set.

According to an exemplary implementation, the number of bits of the feedback information is equal to a product of the number of resource units in the target resource set and a first parameter; or
the number of bits of the feedback information is equal to the number of resource units in the target resource set.

According to an exemplary implementation, the first downlink channel is repeatedly transmitted within L resource units, and the feedback response information corresponding to the first downlink channel occupies L bit groups in the feedback information; and
the number of bits included in each of the bit groups is equal to a value of the first parameter or 1.

According to an exemplary implementation, information of the L bit groups is the same.

According to an exemplary implementation, an order of the L bit groups in bit groups included in the feedback information is same as an order of the L resource units in the target resource set.

According to an exemplary implementation, the first downlink channel is repeatedly transmitted within L resource units, and the feedback response information corresponding to the first downlink channel occupies one bit group in the feedback information; and
the number of bits included in the bit group is equal to a value of the first parameter or 1.

According to an exemplary implementation, an order of the one bit group in bit groups included in the feedback information is same as an order of one of the L resource units in the target resource set.

According to an exemplary implementation, the number of bits of the feedback information is equal to a value obtained by rounding up or rounding down a product of the number of resource units in the target resource set and a first parameter, the product being divided by L; or the number of bits of the feedback information is equal to a value obtained by rounding up or rounding down the number of resource units in the target resource set which is divided by L;
wherein each downlink channel received by the terminal is repeatedly transmitted within L resource units in the target resource set.

According to an exemplary implementation, the feedback response information corresponding to the first downlink channel occupies one bit group in the feedback information; and
the number of bits included in the bit group is a value of the first parameter or 1.

According to an exemplary implementation, an order of the one bit group in bit groups included in the feedback information is equal to:
a value obtained by rounding down K divided by L, where K is equal to the number of a first resource unit occupied by the first downlink channel in the target resource set, and K is a positive integer; or,
a value obtained by rounding up P divided by L, where P is equal to the number of the last resource unit occupied by the first downlink channel in the target resource set, and P is a positive integer.

According to an exemplary implementation, the first parameter is configured by a network; or,
the first parameter is a maximum number of transmission blocks; or,
the first parameter is a maximum number of code block groups.

It should be understood that the terminal can implement the operations implemented by the terminal in the method 200. For brevity, details are not described herein again.

Figure 7:
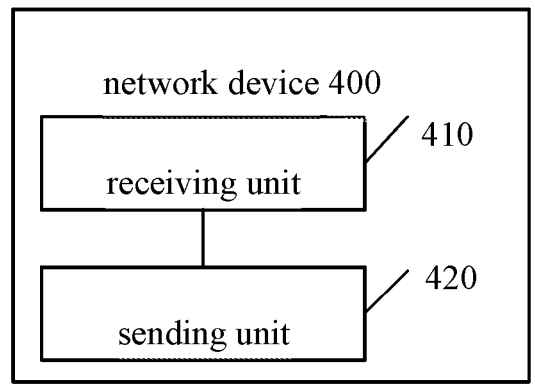
FIG. 7 is a schematic block diagram of a network device according to an implementation of the present disclosure.

FIG. 7 is a schematic block diagram of a network device 400 according to an implementation of the present disclosure. As shown in FIG. 7, the network device 400 includes a receiving unit 410.

The receiving unit 410 is configured to receive feedback information on a first time unit.

The feedback information includes feedback response information corresponding to a first downlink channel transmitted in a target resource set, resource units belong to a same carrier, and the first downlink channel is repeatedly transmitted within a plurality of resource units in the target resource set.

According to an exemplary implementation, the network device 400 further includes a sending unit 420 configured to send a higher layer parameter for a terminal device to determine the target resource set.

According to an exemplary implementation, each resource unit in the target resource set is an occasion for candidate transmission of a downlink channel.

According to an exemplary implementation, the number of resource units in the target resource set is related to the number of bits of the feedback information.

According to an exemplary implementation, the number of bits of the feedback information is equal to a product of the number of resource units in the target resource set and a first parameter; or
the number of bits of the feedback information is equal to the number of resource units in the target resource set.

According to an exemplary implementation, the first downlink channel is repeatedly transmitted within L resource units, and the feedback response information corresponding to the first downlink channel occupies L bit groups in the feedback information; and the number of bits included in each of the bit groups is
equal to a value of the first parameter or 1.

According to an exemplary implementation, information of the L bit groups is the same.

According to an exemplary implementation, an order of the L bit groups in bit groups included in the feedback information is same as an order of the L resource units in the target resource set.

According to an exemplary implementation, the first downlink channel is repeatedly transmitted within L resource units, and the feedback response information corresponding to the first downlink channel occupies one bit group in the feedback information; and
the number of bits included in the bit group is equal to a value of the first parameter or 1.

According to an exemplary implementation, an order of the one bit group in bit groups included in the feedback information is same as an order of one of the L resource units in the target resource set.

According to an exemplary implementation, the number of bits of the feedback information is equal to a value obtained by rounding up or rounding down a product of the number of resource units in the target resource set and a first parameter, the product being divided by L; or,
the number of bits of the feedback information determined by the terminal is equal to a value obtained by rounding up or rounding down the number of resource units in the target resource set which is divided by L;
wherein each downlink channel is repeatedly transmitted within L resource units in the target resource set.

According to an exemplary implementation, the feedback response information corresponding to the first downlink channel occupies one bit group in the feedback information; and
the number of bits included in the bit group is a value of the first parameter or 1.

According to an exemplary implementation, an order of the one bit group in bit groups included in the feedback information is equal to:
a value obtained by rounding down K divided by L, where K is equal to the number of a first resource unit occupied by the first downlink channel in the target resource set, and K is a positive integer; or,
a value obtained by rounding up P divided by L, where P is equal to the number of the last resource unit occupied by the first downlink channel in the target resource set, and P is a positive integer.

According to an exemplary implementation, the network device 400 further includes: a sending unit 420 configured to configure the first parameter for the terminal device; or,
wherein the first parameter is a maximum number of transmission blocks; or,
wherein the first parameter is a maximum number of code block groups.

It should be understood that the network device 400 may implement the operations implemented by the network device in the method 200. For brevity, details are not described herein again.

Figure 8:
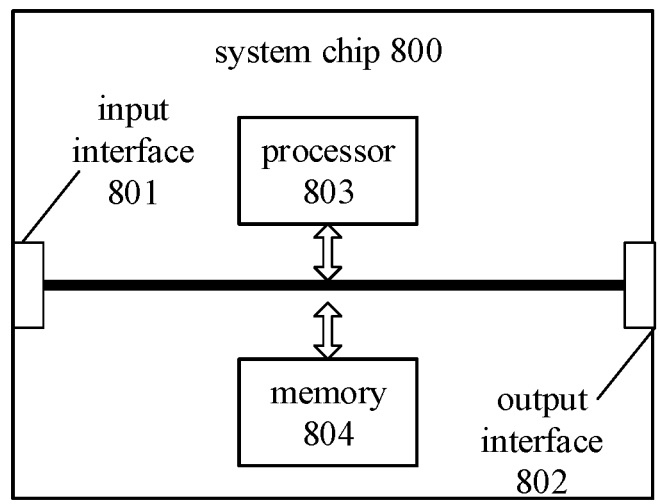
FIG. 8 is a schematic block diagram of a system chip according to an implementation of the present disclosure.

FIG. 8 is a schematic structural diagram of a system chip 800 according to an implementation of the present disclosure. The system chip 800 of FIG. 8 includes an input interface 801, an output interface 802, a processor 803, and a memory 804, and the input interface 801, the output interface 802, the processor 803, and the memory 804 may be connected with each other via internal communication connection lines. The processor 803 is configured to execute codes in the memory 804.

According to an exemplary implementation, when the codes are executed, the processor 803 implements the methods executed by the network device in the method implementations. For brevity, repeated descriptions are not provided again.

According to an exemplary implementation, when the codes are executed, the processor 803 implements the methods executed by the terminal in the method implementations. For brevity, repeated descriptions are not provided again.

Figure 9:
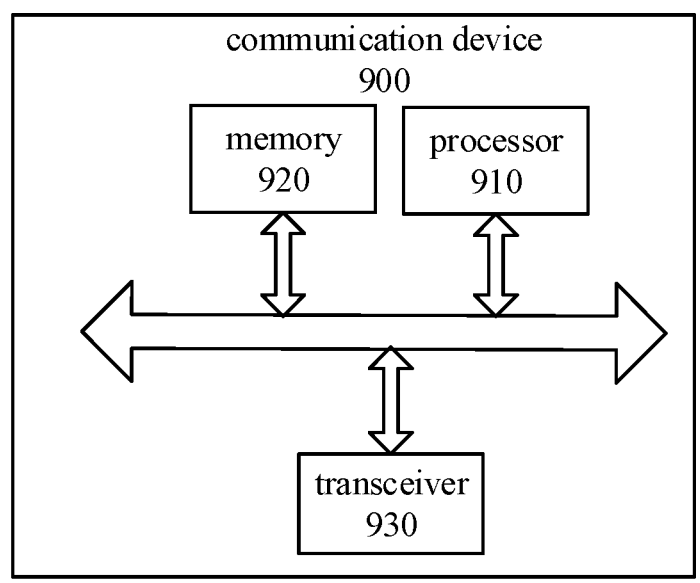
FIG. 9 is a schematic block diagram of a communication device according to an implementation of the present disclosure.

FIG. 9 is a schematic block diagram of a communication device 900 according to an implementation of the present disclosure. As shown in FIG. 9, the communication device 900 includes a processor 910 and a memory 920. The memory 920 may store program codes, and the processor 910 may execute the program codes stored in the memory 920.

According to an exemplary implementation, as shown in FIG. 9, the communication device 900 may include a transceiver 930, and the processor 910 may control the transceiver 930 to communicate with device outside the communication device 900.

According to an exemplary implementation, the processor 910 may call the program codes stored in the memory 920 to perform a corresponding operation of the network device in the method implementations. For brevity, details are not described herein again.

According to an exemplary implementation, the processor 910 may call the program codes stored in the memory 920 to perform a corresponding operation of the terminal in the method implementations. For brevity, details are not described herein again.

It should be understood that the processors in the implementations of the present disclosure may be an integrated circuit chip which has signal processing capability. During implementation, each step of the foregoing method implementations can be completed by an integrated hardware logic circuit in the processors or software instructions. Each of the above-described processors can be a general-purpose processor, a Digital Signal Processors (DSPs), an Application Specific Integrated Circuit (ASIC), a Field Programmable Gate Array (FPGA) or other programmable logic devices, discrete gates or transistor logic devices, discrete hardware components, which can implement or perform the methods, steps, and logical block diagrams disclosed in the implementations of the present disclosure. The general-purpose processor can be a microprocessor or any conventional processor. The steps of the methods disclosed in the implementations of the present disclosure can be directly completed by a hardware decoding processor, or by a combination of hardware and software modules in the decoding processor. The software modules can be located in a storage medium that is well-known in the art such as a random access memory, a flash memory, a read only memory, a programmable read only memory or an electrically erasable programmable memory, a register. The storage medium is located in the memory and the processor reads information in the memory and completes the steps of the above-described methods with its hardware.

It can be understood that the memory in the implementations of the present disclosure can be a volatile memory or a non-volatile memory, or can include both volatile memory and non-volatile memory. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM) that serves as an external cache. By exemplary rather than limiting way, many forms of RAMs can be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories in the systems and methods described herein are intended to include, but not limited to, these and any other suitable types of memories.

Those of ordinary skill in the art will appreciate that the exemplary units and algorithm steps described according to the implementations disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method implementations.

In the implementations provided in the present disclosure, it should be understood that the disclosed systems, devices and methods may be implemented in other ways. For example, the device implementations described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the implementations.

In addition, the functional units in the implementations of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the implementations of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary implementations of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A wireless communication method, comprising:
    receiving, by a terminal device, a first downlink channel, wherein the first downlink channel is repeatedly transmitted within L resource units in a target resource set, L is a positive integer greater than 1, and the resource units in the target resource set are used for transmitting a downlink channel; and
    sending, by the terminal device, feedback information, wherein each group of bits among the L groups of bits comprises N bits, N is equal to 1;
    wherein repeatedly transmitting the first downlink channel within the L resource units in the target resource set, comprises:
    repeatedly transmitting a transport block carried by the first downlink channel within the L resource units;
    wherein a number of bits in the feedback information is equal to a value obtained by rounding up or rounding down the number of resource units in the target resource set divided by L; and
    wherein feedback response information corresponding to the first downlink channel occupies one bit group in the feedback information, and an order of the one bit group in the groups of bits comprised in the feedback information is equal to: a value obtained by rounding up P divided by L, where P is equal to a number of the last resource unit occupied by the first downlink channel in the target resource set, and P is a positive integer.

2. The method according to claim 1, wherein one resource unit in the target resource set corresponds to one group of bits in the feedback information.

3. The method according to claim 1, wherein positions of the L groups of bits in the feedback information are determined according to the L resource units for the first downlink channel.

4. The method according to claim 1, wherein the target resource set is determined according to a higher layer parameter.

5. A wireless communication method, comprising:
    sending, by a network device, a first downlink channel to a terminal device, wherein the first downlink channel is repeatedly transmitted within L resource units in a target resource set, L is a positive integer greater than 1, and the resource units in the target resource set are used for transmitting a downlink channel; and
    receiving, by the network device, feedback information from the terminal device, wherein each group of bits among the L groups of bits comprises N bits, N is equal to 1;
    wherein repeatedly transmitting of the first downlink channel within the L resource units in the target resource set, comprises: repeatedly transmitting of a transport block carried by the first downlink channel within the L resource units;
    wherein a number of bits in the feedback information is equal to a value obtained by rounding up or rounding down the number of resource units in the target resource set divided by L; and wherein feedback response information corresponding to the first downlink channel occupies one bit group in the feedback information, and an order of the one bit group in the groups of bits comprised in the feedback information is equal to: a value obtained by rounding up P divided by L, where P is equal to a number of the last resource unit occupied by the first downlink channel in the target resource set, and P is a positive integer.

6. The method according to claim 5, wherein one resource unit in the target resource set corresponds to one group of bits in the feedback information.

7. The method according to claim 5, wherein positions of the L groups of bits in the feedback information are determined according to the L resource units for the first downlink channel.

8. The method according to claim 5, wherein the target resource set is determined according to a higher layer parameter.

9. A terminal device, comprising one or more processors, memory storing a plurality of programs that, when executed by the one or more processors, cause the terminal device to:

receive a first downlink channel, wherein the first downlink channel is repeatedly transmitted within L resource units in a target resource set, L is a positive integer greater than 1, and the resource units in the target resource set are used for transmitting a downlink channel; and send feedback information, wherein each group of bits among the L groups of bits comprises N bits, N is equal to 1;

wherein a transport block carried by the first downlink channel is repeatedly transmitted within the L resource units;

wherein a number of bits in the feedback information is equal to a value obtained by rounding up or rounding down the number of resource units in the target resource set divided by L; and wherein feedback response information corresponding to the first downlink channel occupies one bit group in the feedback information, and an order of the one bit group in the groups of bits comprised in the feedback information is equal to: a value obtained by rounding up P divided by L, where P is equal to a number of the last resource unit occupied by the first downlink channel in the target resource set, and P is a positive integer.

10. The terminal device according to claim 9, wherein one resource unit in the target resource set corresponds to one group of bits in the feedback information.

11. The terminal device according to claim 9, wherein positions of the L groups of bits in the feedback information are determined according to the L resource units for the first downlink channel.

12. The terminal device according to claim 9, wherein the target resource set is determined according to a higher layer parameter.

* * * * *